July 24, 1951 C. J. MADSEN 2,561,989

FREQUENCY MODULATOR

Filed Aug. 2, 1949

WITNESSES:

INVENTOR
Carl J. Madsen.
BY
ATTORNEY

Patented July 24, 1951

2,561,989

UNITED STATES PATENT OFFICE 2,561,989

FREQUENCY MODULATOR

Carl J. Madsen, Hingham, Mass., assignor to Tropical Radio Telegraph Company, Boston, Mass., a corporation of Delaware Application August 2, 1949, Serial No. 108,187

2 Claims. (Cl. 332—26)

This invention relates to radio transmitting systems in which signals are transmitted by shifts in the frequency of the carrier waves, and it has as an object the provision of such a system particularly suited for the transmission of facsimile signals.

So-called frequency shift, transmitting systems are commonly used for transmitting telegraph and teletype signals. Such systems are, however, non-linear and are not, therefore, suitable for the transmission of facsimile signals where it is required that the variations in signal effect be essentially linear between the limits of pure white to solid black of the pictures or characters to be transmitted.

This invention provides an oscillator circuit for a frequency shift transmitting system in which changes in oscillator frequency are proportional to variations in signal voltages over a wide range, and which can be used for the transmission of facsimile signals as well as for the transmission of telegraph and teletype signals.

The invention will now be described with reference to the drawing, of which:

Figure 1:
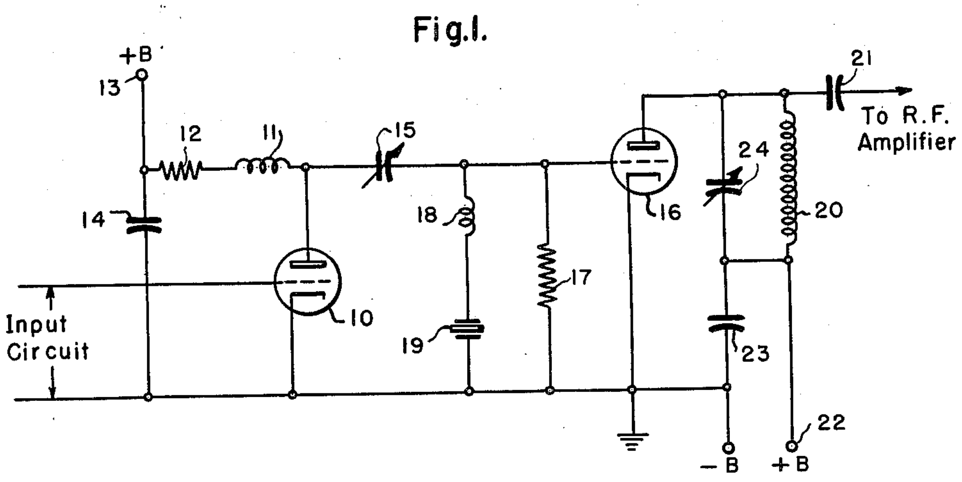
Fig. 1 is a circuit schematic illustrating one embodiment of the invention.

The input signal which may be a varying voltage from a facsimile scanner, is applied between the control grid and cathode of the modulator tube 10, the plate of which is connected through the series connected inductor 11 and resistor 12 to a positive terminal 13 of a conventional, direct supply source, which is not illustrated. The by-pass capacitor 14 is connected to the terminal 13 and to ground.

The plate of the tube 10 is also connected through the variable capacitor 15 to the control grid of the oscillator tube 16. The grid leak resistor 17 is connected between the control grid of the tube 16 and its cathode. The series connected inductor 18 and oscillator crystal 19 are also connected between the control grid and cathode of the tube 16.

The plate of the tube 16 is connected to one side of the tank inductor 20 and through the coupling capacitor to a conventional radio frequency amplifier stage which is not illustrated. The other side of the tank inductor 20 is connected to the positive terminal 22 of the power source, and is connected through the by-pass capacitor 23 to ground, the negative terminal of the power supply source being grounded as is conventional. The variable capacitor 24 is shunted across the tank inductor 20 for tuning same to the oscillator frequency.

The inductor 11 has a high reactance at the normal operating frequency of the crystal 19 whereby it isolates the radio frequency currents in the plate circuit of the tube 10 from the direct current supply source, the by-pass capacitor 14 aiding in this. The capacitor 14 may be omitted if the inductor 11 is carefully selected. The resistor 12 limits the plate current of the tube 10, and its value controls to a large extent, the slope of the input voltage-frequency characteristic curve of the circuit, illustrated by Fig. 2.

The capacitors 14 and 15, the modulator tube 10, the inductor 11 and the resistor 12 form a circuit for adjusting the frequency of the crystal oscillator 19 over a range of several hundred cycles. The capacitor 15 controls the maximum frequency deviation which will be provided by the signal voltage applied to the grid and cathode of the tube 10.

The inductor 18 connected in series with the crystal 19, provides regenerative feedback for increasing the frequency range over which the circuit will oscillate without loss of control by the crystal.

The operation of the circuit will now be described. When the input signal voltage is of such a polarity and value that the grid of the tube 10 is swung sufficiently negative with respect to its cathode that the tube is non-conductive, the effect is as if the capacitor 15 were essentially disconnected from the circuit, the frequency of the oscillator at this time being very near the control frequency. As the negative signal voltage on the grid of the tube 10 decreases, a condition is reached in which the tube is partially conductive, and the effect is as if the capacitor 15 were connected to the cathode of the tube 10 through a very high resistance, thus effectively shunting the crystal circuit, and slightly decreasing its frequency. As the input signal voltage on the grid of the tube 10 becomes increasingly less negative, the shunting effect of the capacitor 15 on the crystal circuit is increased thereby producing a greater decrease in the oscillator frequency. As the input signal causes the grid of the tube 10 to become increasingly positive with respect to its cathode, the oscillator frequency decreases until a point is reached where the resistance of the tube becomes much lower than the reactance of the capacitor 15. A limiting value of frequency change is then reached as illustrated by the upper end of the characteristic curve of Fig. 2.

The change in conductance of the modulating tube 10 is caused by the signal voltage variations between its grid and cathode which provide a varying capacitive reactance effectively in shunt to the oscillator circuit, and which varies substantially linearly within operating limits, with the signal voltage, the effect being as if the capacity of the capacitor 15 were varied linearly with the signal voltage.

If the value of the capacitor 15 is made too large, the circuit will not oscillate. A value of twenty micro-microfarads has been found to be suitable for use with a five megacycle crystal for frequency shifts up to six hundred cycles. The value of the capacitor 15 should be adjusted to provide the desired frequency shift when the tube is fully conductive. When so adjusted, the total frequency shift is definite and uniformly produced for radio-telegraph or radio-teletype operation, in which the signal voltage is at either extreme, for rendering the tube 10 conductive or non-conductive.

For facsimile operation, the frequency change is essentially proportional to the value of the applied signal voltage throughout the normal operating range so that the resulting picture will have the complete range of tone gradation from solid black to pure white.

Figure 2:
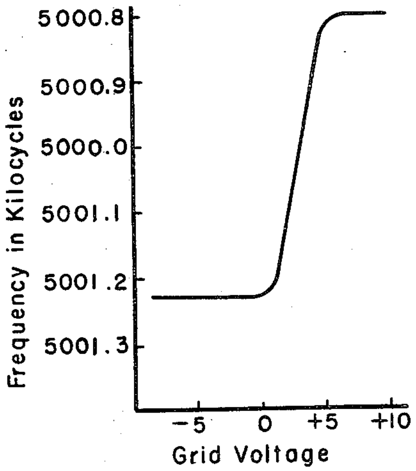
Fig. 2 is a chart illustrating the linear characteristics of the circuit of Fig. 1.

The characteristic curve of Fig. 2 of the drawing illustrates the linearity of response obtained with the circuit of Fig. 1, the normal operating range of the input signal being between plus one and one-half volts and plus six volts. By choice of tube types and plate voltages, the position of the curve along the voltage axis may be shifted. By selection of tube types and the value of the resistor 12, the slope of the characteristic curve may be adjusted to meet system operating requirements.

I claim as my invention:

1. In combination, an oscillator tube having an anode, a cathode and a control grid, a resonant network connected in series with a first capacitor between the anode of said tube and ground, the cathode of said tube being connected to ground, a first resistor connected between the grid and cathode of said tube, an inductance in series with an oscillator crystal shunting said first resistor, a modulator tube having an anode, a cathode and a grid, an inductance connected in series with a second resistor and a second capacitor between the anode and cathode of said modulator tube, said last mentioned cathode being connected to ground, a source of direct current potential having its negative terminal connected to ground and its positive terminal connected to the junction of said second resistor and second capacitor and to the junction of said first capacitor and said resonant network, means for applying a varying direct current potential to the grid of said modulator tube, and a variable capacitor coupling the anode of said modulator tube to the grid of said oscillator tube.

2. For use in transmission of facsimile signals, an oscillator circuit comprising an oscillator tube having an anode, a control grid and a cathode, a resonant network connected in series with a first capacitor between said anode and ground, said cathode being connected to ground, a source of direct current potential connected across said capacitor, and having its negative terminal connected to ground, a first resistor connected between said grid and said cathode, an inductance in series with an oscillator crystal having a resonant frequency of the order of 5 megacycles shunting said resistor, a modulator tube having an anode, a control grid and a cathode, said cathode being grounded, said anode being connected in series with an inductance and a resistor to the positive terminal of an anode potential source, means for applying facsimile signals to the grid of said modulator tube, and a capacitor of magnitude of the order of twenty micro-microfarads connected between the anode of said modulator tube and the grid of said oscillator tube.

CARL J. MADSEN.

REFERENCES CITED

The following references are of record in the file of this patent:

UNITED STATES PATENTS

| Number | Name | Date |
|---|---|---|
| 1,953,140 | Trouant | Apr. 3, 1934 |
| 2,426,295 | Born | Aug. 27, 1947 |
| 2,462,181 | Grosselfinger | Feb. 22, 1949 |